(No Model.)
T. A. GRIFFIN & C. ALKINS.
MANDREL FOR USE IN WELDING LINKS.
No. 326,974. Patented Sept. 29, 1885.
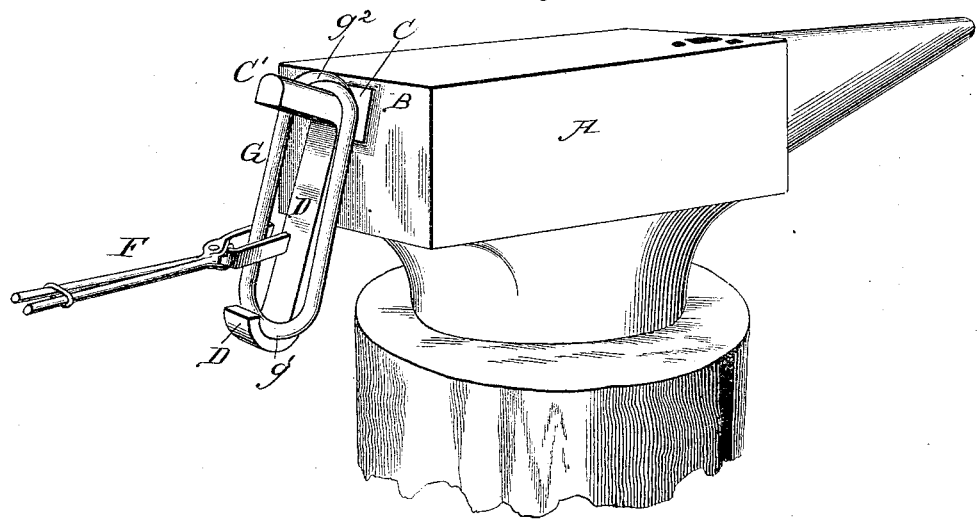
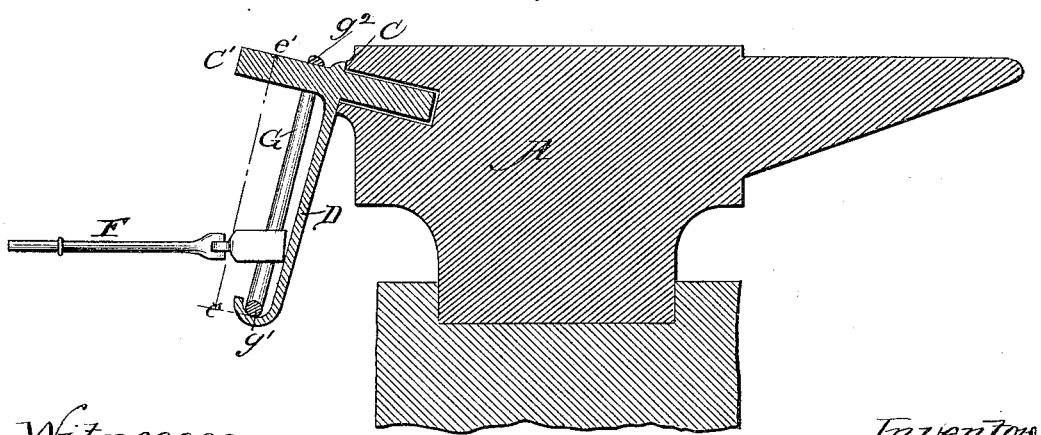
Witnesses.
U. Rossiter
H. Hallock.
Inventors
Thos. A. Griffin
Charles Alkins
By Raymond & Mauey
Attys.

UNITED STATES PATENT OFFICE.

THOMAS A. GRIFFIN AND CHARLES ALKINS, OF CHICAGO, ILLINOIS, ASSIGNORS TO THE AJAX FORGE COMPANY, OF SAME PLACE.

MANDREL FOR USE IN WELDING LINKS.

SPECIFICATION forming part of Letters Patent No. 326,974, dated September 29, 1885.

Application filed June 1, 1885. (No model.)

*To all whom it may concern:*

Be it known that we, THOMAS A. GRIFFIN and CHARLES ALKINS, both of the city of Chicago, county of Cook, and State of Illinois, have invented a new and useful Improvement in Mandrels for Swaging or Welding Links; and we do hereby declare that the following is a full, clear, and exact description thereof, reference being had to the accompanying drawings, and to the letters of reference marked thereon.

The object of our invention is to provide a device for welding links and similar articles, which are desired to be of certain predetermined exterior and interior lengths, and for increasing the stock or strength of the link at the weld.

In the drawings, Figure 1 represents in perspective an ordinary anvil of the construction generally used for hand-work, and showing at one end thereof the application of our improved mandrel with a link in position for welding, the latter also being in perspective, Fig. 2 showing a vertical section through the anvil and mandrel shown in Fig. 1.

In said drawings, A represents an anvil (or a bed-plate of a trip-hammer) having a socket, B, in which to insert the mandrel C, having the projection C', upon which the link to be welded is to be hung.

D is a horn upon which the link rests while being welded, and is preferably made in one piece with the mandrel C and projection C'.

F is a pair of tongs by which the link and mandrel are held and manipulated.

G represents an ordinary car-coupling link, which is made of one rod or bar bent at $g'$ and $g^2$, to be welded or forged on the mandrel at $g^2$. It is preferable that such links should be of a certain predetermined length both internally and over all.

The bar or rod of which the link is constructed being of uniform thickness, the length of the link is determined by the distance between the upper side of the bend $e$ in the horn D and the upper side, $e'$, of the projection C' of the mandrel. The mandrel, with the horn D attached, is removable, and the size or length of the link desired to be welded being determined, a mandrel with a horn of the necessary length is selected and fixed into the socket B of the anvil.

The bent rod or bar, having been heated to a welding heat, (and preferably having been bent, as is the custom, so that the ends are lapped at $g^2$,) is placed upon the horn D, and the ends at $g$ are welded over the mandrel.

By welding links on our device the stock at the weld is upset and increased, and the link there becomes as strong as in any other part. The mandrel is made loose, so as to move in the arc of a circle equal in length to the length of the weld to be made by the hammer. Our device is specially designed for use with a stationary or trip hammer; but the weld can be made in the ordinary way by hand.

It is sufficient for all practical purposes that the socket B shall be inclined, as shown; but it may be constructed on an anvil or bed-plate at any angle thereto, the mandrel being secured therein by any well-known means which permits it to be revolved. The link fitting into the horn D and resting with its full weight thereon, the tongs F, by which the link is placed in position, in revolving the said link will also revolve the mandrel for the purpose of swaging or welding.

Having now fully described our invention, we claim—

The mandrel C, having the horn D, constructed substantially as and for the purpose set forth.

THOMAS A. GRIFFIN.
CHARLES ALKINS.

Witnesses:
P. H. T. MASON,
G. F. CLAUGH.